Dec. 16, 1941.  C. W. MacMILLAN  2,266,224
WHEEL ALIGNER
Filed Jan. 16, 1941  2 Sheets-Sheet 1

INVENTOR.
Charles W. MacMillan
BY
Parker & Burton
ATTORNEYS.

Dec. 16, 1941.   C. W. MacMILLAN   2,266,224
WHEEL ALIGNER
Filed Jan. 16, 1941   2 Sheets-Sheet 2
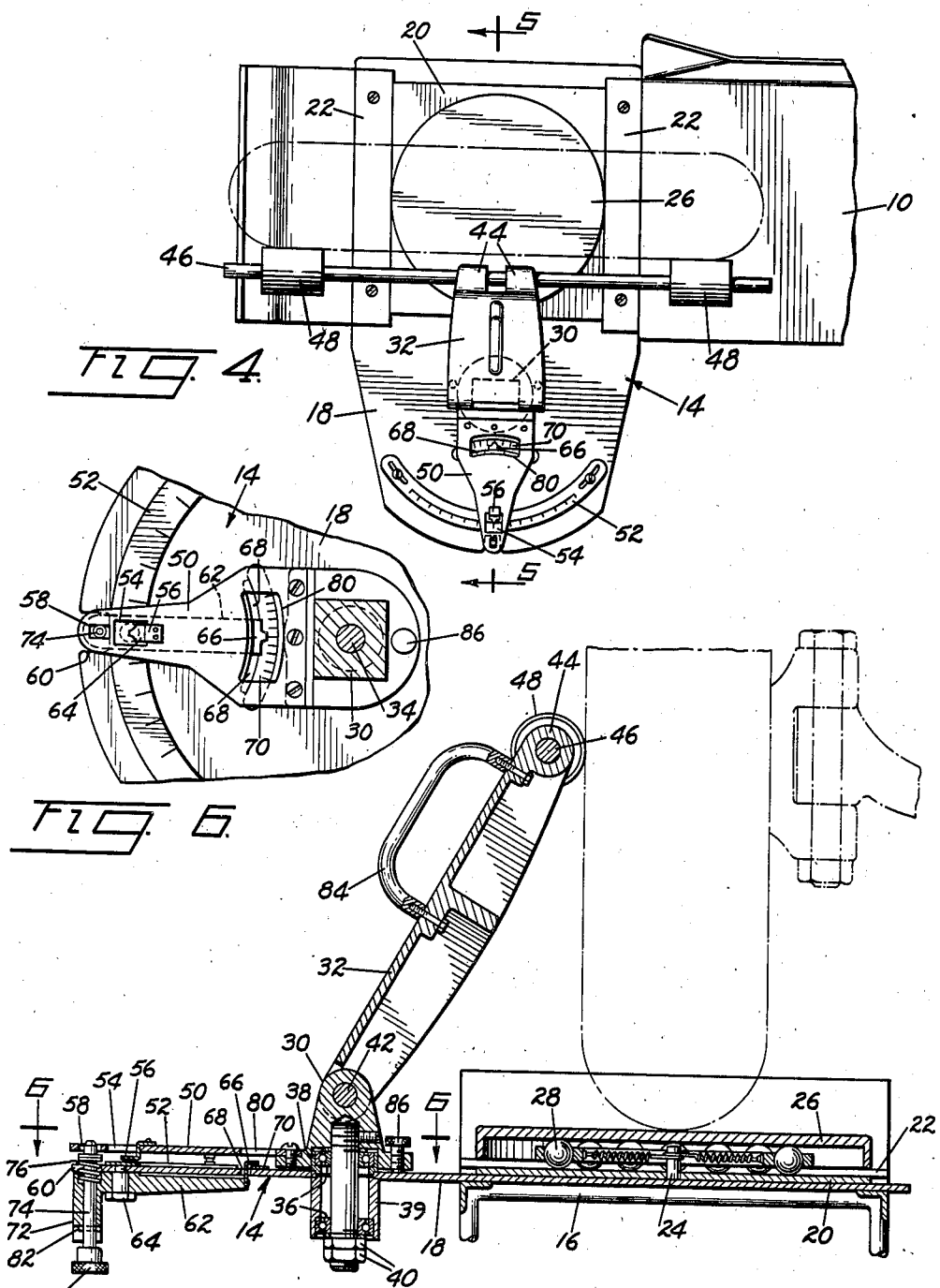
INVENTOR.
Charles W. Mac Millan
BY Parker & Burton
ATTORNEYS Patented Dec. 16, 1941

2,266,224

UNITED STATES PATENT OFFICE 2,266,224

WHEEL ALIGNER

Charles W. MacMillan, Jackson, Mich., assignor to Hinckley-Myers Company, Jackson, Mich., a corporation of Michigan Application January 16, 1941, Serial No. 374,623

12 Claims. (Cl. 33—203)

This invention relates to devices for checking the alignment of vehicle steering wheels and particularly to improvements in the type of apparatus described in United States Patent No. 2,115,766.

An important object of this invention is to provide an improved apparatus for checking and measuring certain wheel alignment characteristics and one which is economical to manufacture and to assemble at the place of use. Another important object of this invention is to provide a novel apparatus which is not only capable of assisting in the measurement of the castor, camber and king pin angles of the axis about which the steering wheels turn but also is capable of quickly measuring and indicating the toe-in angle of the steering wheels.

Another important object of this invention is to provide improved equipment for checking wheel alignment including two novel gauge units, one for each wheel, adapted to assist in the measurement of castor, camber and king pin angles of the axes about which the steering wheels turn and having novel means associated therewith for determining the toe-in angle of a pair of steering wheels. Each gauge unit is provided with such a toe-in measuring device. An important novel feature of the invention is a provision for disconnectedly coupling the toe-in measuring device with the operating parts of the gauge unit. The novel operating connection is such that the small toe-in angles of the steering wheel are magnified for careful measurement. Another important feature of the invention is the provision of a novel mounting for each gauge unit which provides practically frictionless swinging movement of that part of the gauge which engages the wheel in order not to disturb the setting of the apparatus or the wheel.

Another object of this invention is to provide an improved form of runway structure for supporting the vehicle during the wheel alignment test. The parts of this runway structure are so formed that it may be quickly and easily assembled upon a floor and immovably secured thereto. An important novel feature of the runway is the provision for adjusting the structure in order to level the runway irrespective of the floor conditions.

Figure 1:
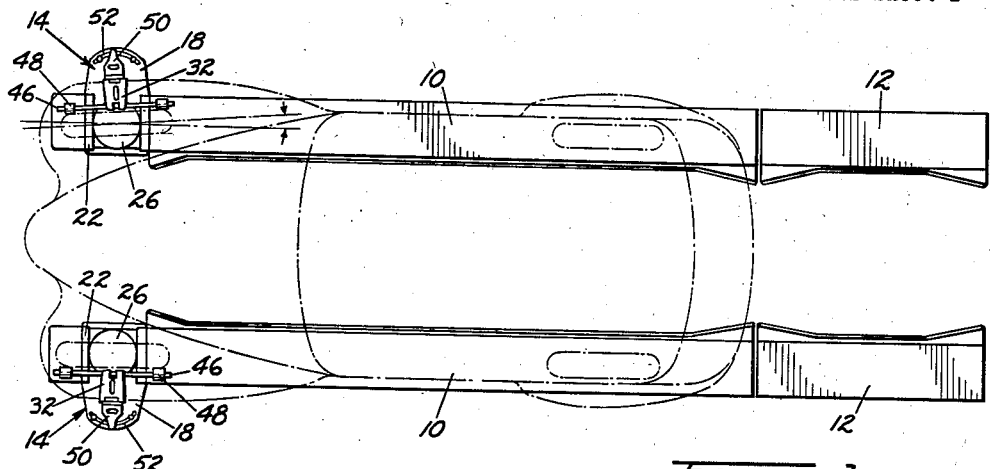
Figure 2:
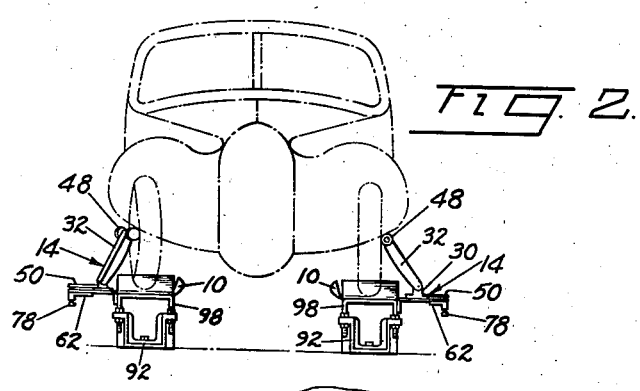
Figure 7:
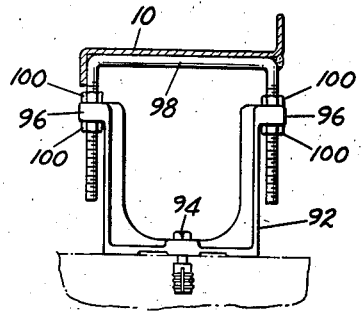
Figure 3:
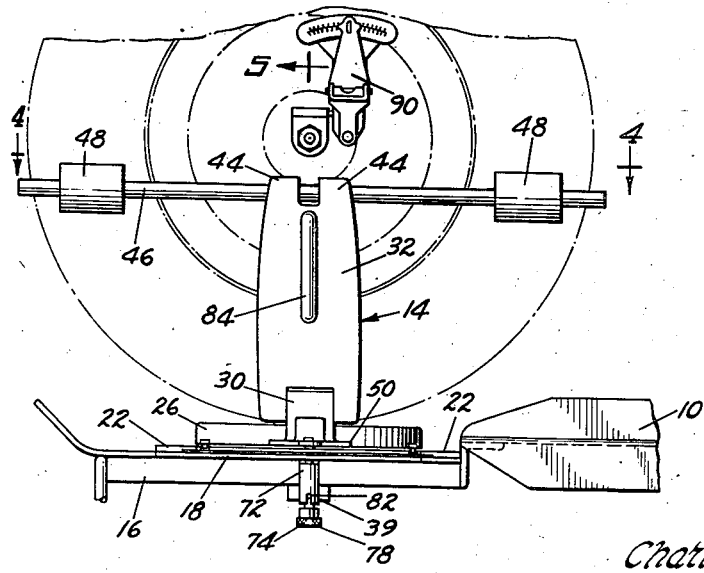

Other objects, advantages and meritorious features of this invention will become more fully apparent from the following description, appended claims and accompanying drawings, wherein:

Fig. 1 is a top plan view of the runway structure showing the location of the gauge unit and by dotted outline the position assumed by the vehicle on the runway during the testing operation, Fig. 2 is a front end view of the runway showing one of the positions assumed by the gauge unit for checking the toe-in angle of the steering wheel, Fig. 3 is an enlarged detail view of the side of one of the gauge units showing it in operating position against the side of the vehicle steering wheel, Fig. 4 is a top view of a testing end of one of the runways showing the gauge unit assembly in operating position, Fig. 5 is a sectional view through one of the gauge units along line 5—5 of Fig. 4, Fig. 6 is a detail view of the gauge unit of Fig. 5 along line 6—6 thereof, and Fig. 7 is a view in elevation of a runway support.

Referring in detail to the drawings, the general construction of the apparatus comprises two parallel runways or tracks 10—10 upon which the right and left wheels of a vehicle are run. The runways are elevated from the floor by a series of novel adjustable supports to be described hereinafter which permit leveling of the runways no matter what the condition of the floor may be. The rear end of the runway is provided with an inclined ramp 12 up which the automobile is driven to reach the level sections of the runway. Mounted on the forward end of the runway are novel gauge units or heads indicated generally at 14—14.

Each gauge unit 14 is a separate assembly removably secured to the forward end of the runway. Each runway is provided with floor supported frame structure 16 which extends beyond the forward end thereof at a level slightly below that of the runway. This structure is adjustably supported from the floor by the same novel support as the rest of the runway. The gauge unit 14 includes a flat horizontal platform or base plate 18 resting on the structure 16 and extending laterally to the side thereof opposite the other runway as Fig. 4 shows. This base plate is supported at a level slightly below that of the runway and is secured to the frame structure in any suitable way such as by welded connections.

Mounted on the platform or base plate 18 in line with the runway is a turntable assembly. This assembly includes a plate 20 slidably adjustable in a transverse direction between guiding metal strips 22—22 secured to the base plate. Fixed to plate 20 is an upright central stud 24. Surmounting the stud is a disc 26 upon which the steering wheel of the vehicle to be tested is supported. The disc is freely supported from the plate 20 by a ball bearing assembly 28 so constructed as to allow the disc to rotate and to shift laterally a limited distance in any direction. The ball bearing assembly is similar to that described in the Graham et al. Patent No. 2,155,541, and permits the wheel supported to shift laterally as it is turned from one side to the other.

On the side portion of the base plate 18 of each gauge unit is a structure capable of contacting the side of the wheel supported on the turn table which is in general like that described in the Graham et al. Patent No. 2,115,766 but differs in certain important respects therefrom. It comprises a part 30 pivotally secured to the base plate for rotation about a vertical axis and a second part 32 pivotally secured to the first part about a horizontal axis for swinging movement toward and away from the side of the wheel on the turntable. The movement about the vertical axis is provided by a stud or pin 34 fixed to the part 30 and extending through a hole provided in the base plate. The stud is supported in ball bearing assemblies 36—36, one of which is disposed above the base plate in a bearing cup 38 and the other in a combination bearing cup and spacer 39 below the base plate. The bearings provide substantially frictionless rotation of the part 30, an important feature as will be described in connection with the operation of the device. The upper end of the stud 34 is threadedly received in the part 30. Jam nuts 40 on the lower end serves to hold the parts in compact relation.

The part 32 is pivoted to the part 30 about a journal pin 42. The upper end of the part 32 is thickened as indicated at 44 in Fig. 5 and apertured to receive a rod 46. This rod is horizontally slidable through the upper end of part 32 and is preferably of a length at least equal to the diameter of the tire on the wheel. Secured to the opposite end of the rod are adjustable and detachable cylindrical members 48—48. These members engage the side of the tire as shown in Fig. 3 and will align the rod in the direction of the plane of the wheel. The two members 30 and 32 of the structure swivel with respect to one another and the base plate to allow the members 48—48 to contact the sides of the tire. When the wheel is turned to a relatively large angle it is usually necessary to slide the rod 46 through the arm in order to bring the cylindrical members 48—48 in contact with the tire at points equidistant from the center of the wheel.

Means in the form of scale and pointer elements are provided for measuring the angle of turn of the wheel on the turntable. A member or arm 50 is secured to the part 30 of the gauge. It is relatively wide at its point of attachment to the part but tapers at its outer end as shown in Fig. 6. On the top side of the base plate is secured an arcuate metal band 52 etched or otherwise provided with scale readings. The tapered extremity of the arm 50 swings over the scale. It is apertured at 54 above the scale and a pointer element 56 depends therefrom to a point close to the scale for accurate readings of the wheel turns. The center of curvature of the scale is on the axis of the journal stud 34. The scale has a limited amount of adjustment in an arcuate path about the axis of the center in the manner described in the Graham et al. Patent No. 2,115,766. This adjustment enables the operator to set the zero of the scale with reference to the position of the wheel instead of driving the vehicle back and forth on the runway until the wheel in straight ahead position gives a zero reading on the scale.

Each wheel gauge is provided with a novel device for determining another factor of wheel alignment, namely, the toe-in angles of wheels. This device includes a scale and pointer assembly which is operatively coupled with the previously described structure and utilizes the latter in determining the toe-in angularity of the wheels. This operating connection avoids the necessity of providing a separate wheel contacting apparatus for the toe-in measuring device. Moreover, as will be described hereinafter, this operating connection multiplies the movement of the part for exact measurement and is disconnectable from the structure to permit the use of the latter independently of the toe-in device.

As shown in Fig. 6, the outer extremity of the member 50 is provided with a rectangular slot 58 which in the zero position of the pointer on the scale 52 registers with a recess 60 in the edge of the base plate 18. To the bottom side of the base plate is pivoted a toe-in ratio indicating arm 62. Its pivotal axis is formed by a stud 64 adjacent to the recess 60. The pivot stud divides the arm into a longer section projecting inwardly toward the wheel gauge unit and a shorter section which extends to a position below the recess 60. On the end of the longer section of the arm is secured a pointer element 66 which rises through an arcuate slot 68 in the base plate. The center of curvature of the arcuate slot is on the pivotal axis of the arm. The upper end of the pointer element 66 is bent to overlie a scale 70 which is suitably marked to indicate toe-in readings.

The section of the arm 62 below the recess 60 extends downwardly toward the floor to form a guide 72 for a vertical reciprocating plunger 74. The upper end of the plunger projects through the recess 60 in the base plate and into the slot 58 in the end of the wheel gauge arm 50 as shown in Fig. 5. A coiled spring 76 seated at one end on a shoulder in the guide and on a washer carried on the plunger rod serves to yieldingly raise the plunger so that its upper end will normally extend into the slot 58. The bottom end of the plunger is provided with a control knob 78 which may be grasped by the operator to pull the plunger down against the tension of spring 76 and withdraw the upper end of the plunger from the slot 58. The widened portion of the arm 50 above the toe-in scale 70 is provided with an elongated slot 80 in order to expose the scale to view from above.

The plunger assembly forms a disconnectable operating connection between the wheel turning gauge arm 50 and the toe-in radius arm 62. It is obvious that when the plunger assumes its normal raised position the two arms are associated together for joint operation and movement of the gauge parts 30 and 32 about their vertical axis will cause swinging movement of the arm 62 and the pointer 66 carried thereby. The location of the pivotal axis of the toe-in arm 62 adjacent to the recess 60 multiplies the movement of the gauge arm 50 at the pointer end of the toe-in gauge. When the operating connection formed by the plunger 72 is in use it will abut the end of the recess 60 in the edge of the base plate and will limit the amount of movement of the part depending upon the length of the recess. When the plunger is pulled down the arm 50 is free to swing in large arcs over the base plate. Provision is made for releasably holding the plunger in retracted position against the tension of the spring 76. This is accomplished by providing the guide 72 with a vertical slot opening out at the bottom in which rides a pin 82 on the plunger rod. The construction is such that when the rod is pulled down far enough to withdraw the pin out of the slot and turned, the pin is brought into locking engagement with the bottom edge of the guide.

Large turning movements of the steering wheel are desirable in the determination of the caster, camber, and king pin angles of the swiveling axis about which the steering wheels are turned. An aligning gauge, generally indicated at 90 and of the type described and claimed in the Graham Patent No. 2,074,108, may be attached to the wheel spindle and upon turning the wheel through prescribed angles, readings of the caster, camber, and king pin angles can be made from the gauge.

The two gauge units on the runway assembly herein described cooperate with one another in quickly determining the toe-in characteristics of the steering wheel. The toe-in scale 70 on the respective units are calibrated to read the total toe-in of the two front wheels. This is readily accomplished by disposing one of the wheels in a straight-ahead position and with the toe-in device associated with this wheel set at zero, the total toe-in of the two wheels can be read from the device at the other wheel. This last reading is made after the part of the gauge unit associated with the second wheel is swung until the wheel contacting members 48—48 abut the side of the tire. In this position, the pointer element 66 on the toe-in arm 62 of this gauge will give the correct reading of the total toe-in of the two wheels. Variations in the diameter of the tire on the wheels tested will have a small but negligible effect upon the toe-in readings. It is preferred that the toe-in scale be calibrated for measuring wheels having a standard tire diameter such as 30″. Tires differing in diameter from this standard can be measured by this device and slight discrepancies in size will have no practical effect upon the reading.

The parts are constructed for accurate measurement. For example, the ball bearings 38—38 afford practically frictionless turning movement of the gauge. With the provision of a handle 84 on the part 32, it is possible by virtue of the provision of the ball bearing assembly to merely swing the part 32 toward the tire and after contact of one of the members 48 against the tire, continued application of force in this direction will cause the structure to swing about its vertical axis until the other wheel contacting member 48 abuts the tire. The operator need not intentionally exert force to turn the parts about the vertical axis. This is important, since any over exertion might press one or both wheel contacting members into the tire and due to the movement magnifying connection to the toe-in indicator cause an inaccurate reading to be made.

To assist in the operation of setting the machine up and squaring the same, each gauge unit is provided with a set screw 86 on the part 30 which is adjustable to frictionally engage the base plate 18 and hold the same from accidental movement while the parallelism of arms 46 is checked. Each base plate may be curled at its forward end as indicated in Fig. 3 to act as a stop preventing the wheels from rolling off the runways.

As previously mentioned, novel units are provided for adjustably supporting the runway from the floor. Each runway is provided with a series of adjustable floor engaging brackets having the general U-shaped configuration. One such bracket is shown at 92 in Fig. 7. The base of each bracket is flattened for bearing upon the floor. A lag bolt 94 having an expansion nut may be used to lock each bracket to the floor.

The upper ends of the arms of each U-shaped bracket extend laterally as shown to form a support 96 through which the opposite ends of a bent rod 98 extend. The latter is bent in the form of a U and inverted as shown. One such bent rod is associated with each bracket and the top sides of the bent rods form a support for the runways and the base plates 18. The ends of each rod 98 are threaded, and nuts 100 threaded on the rods above and below the supports 96 hold the rod in any position of adjustment. The height of the rod may be readily varied by varying the position of the nuts.

When the wheel aligning equipment is assembled, the sections of the apparatus carrying the two wheel alignment heads and the turntables are first installed in position and fastened to the floor. The legs supporting these sections are adjusted until the top of the turntable is at a prescribed height from the floor. The toe-in locking device is engaged and the toe-in pointer set to zero. The set screw 86 shown in Fig. 5 is tightened to hold the pointer on zero while setting the alignment heads parallel. The anchor bolts 94 are installed and screwed into the expanders, but left in slightly loose condition for any adjusting that may be necessary. Using a straight edge and level the turntables of the alignment heads are adjusted until they are at the same level lengthwise and at right angles to the runways. By means of a cord or other implement stretching from one gauge unit to the other and attached to two aligning points on each unit it is possible by shifting the alignment heads to bring the heads into proper parallel relationship. With the use of the same or a similar cord it is possible to check the distances between the front and rear ends of the contact bars 46—48 of the two units in their upright position and their pointers 50 at zero. The distances should be equal with the toe-in pointers in locked position and set on zero.

Following this, the runways 10—10 are set in position in line with the turntables of the gauge units. Any suitable means may be employed for registering the runways in proper alignment with the testing head supports while adjusting the runways. Expansion bolts 94 are inserted to fasten the legs of the runways to the floor but are preferably kept loose in order that adjustments may be made as the installation proceeds. Runways should be adjusted until level with turntables. They should be level along their length and with each other. When level conditions are established the bolts are tightened in place to secure the apparatus firmly to the floor.

What I claim:

1. Apparatus for checking turning characteristics of vehicle dirigible wheels including a support upon which a dirigible wheel of a vehicle is mounted, a gauge for measuring the turning angle of the wheel on the support comprising a scale member and an indicating member, one of said members being movably supported and adapted to be coupled with the wheel to be adjustably positioned thereby relative to the other member to indicate the angle of turn of the wheel, means for measuring the toe-in angle of a dirigible wheel thus supported including a scale element calibrated to measure the toe-in angle and an indicating element, one of said elements being mounted for movement relative to the other, and a detachable operating connection between said movable element and the movable member of said gauge to effect movement of the former when the gauge member is adjustably positioned by the wheel.

2. A device for measuring turning characteristics of vehicle dirigible wheels comprising, in combination, a support upon which the vehicle dirigible wheel is mounted for turning, a gauge for measuring the angle of turn of the wheel comprising a scale element and a pointer element, one of said elements adapted to be coupled with the wheel to be adjustably positioned thereby relative to the other element to indicate the angle of turn of the wheel, means including a pointer member and a scale member for indicating the toe-in angle of the wheel thus supported, one of said members being movable relative to the other member and coupled with the movable element to be actuated and to have its movement multiplied thereby when said element is adjustably positioned by the wheel and to indicate such movement on the scale member.

3. A device for measuring the turning angles for vehicle dirigible wheels comprising, in combination, a support upon which a dirigible wheel of a vehicle may be mounted for turning, an upright structure adjacent said support having means for contacting spaced points on the side of the vehicle wheel resting on said support, means mounting said structure for pivotal movement about a vertical axis and for movement of its contacting means toward and away from the wheel, means for indicating the extent of the turning movement of the structure and the wheel contacted thereby, comprising a scale and a pointer coupled with the structure and supported to swingably traverse the scale, a scale calibrated to read the toe-in angle of vehicle dirigible wheels, a pointer mounted to swing over said toe-in scale, a plate carrying said scales, one of said pointers supported above said plate to swing over its scale, the other pointer supported below said plate to swing over its scale, means coupling the second pointer to the first pointer to be actuated thereby.

4. A device for measuring the turning angles of vehicle dirigible wheels comprising, in combination, a base plate, a structure movably supported upon the base plate and movable into contact with the side of a vehicle dirigible wheel, and responsive to swivelling movement of the wheel, a scale carried by the base plate for measuring the turning angle of vehicle dirigible wheels, a second scale carried by said base plate for measuring the toe-in angles of vehicle dirigible wheels, two pointers, one movable over each scale, one of said pointers attached to said structure and movable therewith, the other pointer attached to said base plate for movement over its respective scale, and means for disconnectedly coupling the two pointers together so that movement of one effects movement of the other.

5. A device for measuring the turning angles of vehicle dirigible wheels comprising, in combination, a base plate, an upright structure for contacting the side of a vehicle dirigible wheel including one part pivotally secured to said base plate for turning movement about a vertical axis and a second part connected to said first part for turning movement about a horizontal axis, means for measuring the turning movement of said structure about said vertical axis and adapted when said second part is brought into contact with the side of a vehicle dirigible wheel to measure the turn of the wheel from its straight ahead position, comprising a scale carried by the base plate and a pointer supported to swing over said scale and coupled with said first part to be actuated thereby, a second scale carried by said base plate calibrated to measure the toe-in angle of vehicle dirigible wheels, a pointer pivoted to said base plate to swing over said scale, and means for detachably connecting said last pointer to said first part of the upright structure through said first pointer.

6. A device for measuring the turning angles of vehicle dirigible wheels comprising, in combination, a base plate, an upright structure including a part pivotally secured to said base plate for turning movement about a vertical axis and a second part pivoted to said first part for turning movement about a horizontal axis, a scale on said base plate, a pointer carried by said first part of said structure movable over said scale and adapted when said second part is brought up against the side of a vehicle dirigible wheel to indicate on said scale the turn of the wheel from its straight ahead position, a second scale on said base plate calibrated to measure the toe-in angle of vehicle dirigible wheels, a pointer pivoted to said base plate to swing over said toe-in scale, and means for detachably connecting said pointers together.

7. A device for measuring the turning angle of vehicle dirigible wheels comprising, in combination, a base plate, an upright structure including a part pivotally secured to said base plate for turning movement about a vertical axis and a second part pivoted to said first part for turning movement about a horizontal axis, said second part extending laterally for contact with spaced points on the side of a vehicle dirigible wheel, a scale on the top side of said base plate, a pointer carried by said first part of the structure movable over said scale and adapted when said second part of the structure contacts the side of a vehicle dirigible wheel to indicate on the scale the degree of turn of the wheel with respect to its straight ahead position, a second scale on the top side of said base plate calibrated to read toe-in angles of vehicle dirigible wheels, said base plate provided with a slot adjacent said toe-in scale, a pointer pivotally mounted to the under side of the base plate having a part projecting through said slot and swingable over said toe-in scale, and means for detachably connecting said pointers together whereby the device may be used to measure the toe-in angle of the vehicle dirigible wheels.

8. Apparatus for checking wheel alignment characteristics of steering wheels of vehicles comprising, in combination, a support upon which a vehicle steering wheel is mounted for turning movement, a gauge rotatable about a vertical axis and carrying means translatable horizontally for contact with spaced points on the side of the wheel, a scale element and a pointer element movable relative to one another, a movement multiplying connection between one of said elements and said gauge and movable therewith over the other element for indicating relatively small rotatable movements of the gauge about its vertical axis, and ball bearing means providing practically frictionless rotatable movement of the gauge about its vertical axis and rendering it sufficiently sensitive to turning forces that continued force to translate said wheel contacting means toward the side of the wheel after contact at one point has been made will cause the gauge to rotate about its vertical axis until contact has been made at another point on the side of the wheel.

9. A device for measuring the turning characteristics of a swivelled wheel of a vehicle comprising, in combination, a support upon which the swivelled wheel of a vehicle may rest for turning, a gauge for measuring the angle of turn of the wheel including a scale element and a pointer element, said pointer element adapted to be coupled with the wheel and pivotally supported to be swung relative to the scale element in response to turning of the wheel, means including a scale member and a pointer member for indicating toe-in characteristics of the wheel, said pointer member being pivotally supported to be swung relative to the scale member and coupled with said pivotally supported pointer element to be actuated thereby when said element is swung in response to turning movement of the wheel, the pivotal support of the pointer member being positioned in proximity to the scale element and in proximity to the free end of the pointer element, and the free end of the pointer member extending toward the pivotal support of the pointer element.

10. A device for measuring the turning characteristics of a swivelled wheel of a vehicle comprising, in combination, a support upon which the swivelled wheel of a vehicle may rest for turning, a gauge for measuring the angle of turn of the wheel including a scale element and a pointer element, said pointer element adapted to be coupled with the wheel and pivotally supported to be swung relative to the scale element in response to turning of the wheel, means including a scale member and a pointer member for indicating toe-in characteristics of the wheel, said pointer member being pivotally supported to be swung relative to the scale member and coupled with said pivotally supported pointer element to be actuated thereby when said element is swung in response to turning movement of the wheel, said scale member being positioned underneath the pointer element, said pointer element being provided with an aperture exposing said scale element.

11. A device for measuring the turning characteristics of a swivelled wheel of a vehicle comprising, in combination, a support upon which the swivelled wheel of a vehicle may rest for turning, a gauge for measuring the angle of turn of the wheel including a scale element and a pointer element, said pointer element adapted to be coupled with the wheel and pivotally supported to be swung relative to the scale element in response to turning of the wheel, means including a scale member and a pointer member for indicating toe-in characteristics of the wheel, said pointer member being pivotally supported to be swung relative to the scale member, and means coupling said pointer member with the outer end of the pointer element for swinging movement of the pointer member in response to swinging movement of the pointer element.

12. A device for measuring the turning characteristics of a swivelled wheel of a vehicle comprising, in combination, a support including a part upon which the wheel may rest for turning, an upright structure mounted on such support to be moved into contact with the side of a wheel resting thereupon, such structure pivotally supported to swing in response to turning movement of the wheel, a gauge to measure the angle of turn of the wheel including a scale element and a pivoted pointer element, said pointer element coupled with the support to be actuated thereby in response to swivelling of the wheel and adapted to traverse said scale, and a gauge for measuring toe-in including a scale member and a pointer member, said pointer member coupled with the support through said pointer element and adapted to swing over the scale member in response to swivelling of the wheel.

CHARLES W. MacMILLAN.